(12) United States Patent
Take

(10) Patent No.: US 8,371,617 B2
(45) Date of Patent: Feb. 12, 2013

(54) EXPANSION JOINT FOR PIPE SYSTEM

(75) Inventor: Rafael C. Take, Wildwood, MO (US)

(73) Assignee: MECS, Inc., Chesterfield, MO (US)

( * ) Notice: Subject to any disclaimer, the term of this patent is extended or adjusted under 35 U.S.C. 154(b) by 490 days.

(21) Appl. No.: 12/619,404

(22) Filed: Nov. 16, 2009
(Under 37 CFR 1.47)

(65) Prior Publication Data
US 2010/0244439 A1    Sep. 30, 2010

Related U.S. Application Data

(60) Provisional application No. 61/115,353, filed on Nov. 17, 2008.

(51) Int. Cl.
*F16L 35/00* (2006.01)
(52) U.S. Cl. ......... 285/114; 285/229; 285/235; 285/226
(58) Field of Classification Search ................. 285/223, 285/229, 235, 236, 114, 226
See application file for complete search history.

(56) References Cited

U.S. PATENT DOCUMENTS

| | | | | | |
|---|---|---|---|---|---|
| 395,671 | A | * | 1/1889 | Thayer | 285/114 |
| 401,706 | A | * | 4/1889 | Legat | 285/114 |
| 809,977 | A | * | 1/1906 | O'Brien | 285/114 |
| 933,516 | A | * | 9/1909 | Witzenmann | 285/114 |
| 973,901 | A | * | 10/1910 | Witzenmann | 285/114 |
| 996,899 | A | * | 7/1911 | Witzenmann | 285/114 |
| 1,340,818 | A | * | 5/1920 | Brinkman | 285/114 |
| 1,886,332 | A | * | 11/1932 | Flavin | 285/300 |
| 1,953,006 | A | * | 3/1934 | Norris | 285/114 |
| 1,999,663 | A | * | 4/1935 | Paige | 285/114 |
| 2,299,160 | A | * | 10/1942 | MacPherson | 285/114 |
| 2,394,270 | A | * | 2/1946 | Swain | 285/114 |
| 2,707,972 | A | * | 5/1955 | Delwyn et al. | 285/114 |
| 2,759,765 | A | * | 8/1956 | Pawley | 285/114 |
| 2,807,480 | A | * | 9/1957 | Hughes et al. | 285/114 |
| 2,908,295 | A | * | 10/1959 | Beazley | 285/114 |
| 3,032,357 | A | * | 5/1962 | Shames et al. | 285/114 |
| 3,070,387 | A | * | 12/1962 | Peyton | 285/114 |
| 3,266,059 | A | * | 8/1966 | Stelle | 285/223 |
| 3,830,529 | A | | 8/1974 | Domer | |
| 3,869,151 | A | * | 3/1975 | Fletcher et al. | 285/114 |
| 4,204,707 | A | * | 5/1980 | Lincicome et al. | 285/114 |
| 4,307,754 | A | * | 12/1981 | Muratsubaki | 138/108 |
| 4,480,858 | A | | 11/1984 | Ayers | |
| 4,746,148 | A | | 5/1988 | Perkins | |
| 5,248,170 | A | | 9/1993 | Francis | |
| 6,837,523 | B2 | * | 1/2005 | Surjaatmadja et al. | 285/114 |
| 7,503,590 | B2 | * | 3/2009 | Challender et al. | 285/261 |
| 7,677,606 | B2 | * | 3/2010 | Rohwedder | 285/226 |

* cited by examiner

*Primary Examiner* — David E Bochna
(74) *Attorney, Agent, or Firm* — Senniger Powers LLP

(57) ABSTRACT

An expansion joint for a pipe system includes a deformable section interconnecting first and second pipe sections. A first mount is secured to the first pipe section in a passageway of the first pipe. A second mount is secured to the second pipe section in a passageway of the second pipe. A flexible tension member, extending through the deformable section, tethers the first and second mounts to each other.

15 Claims, 20 Drawing Sheets

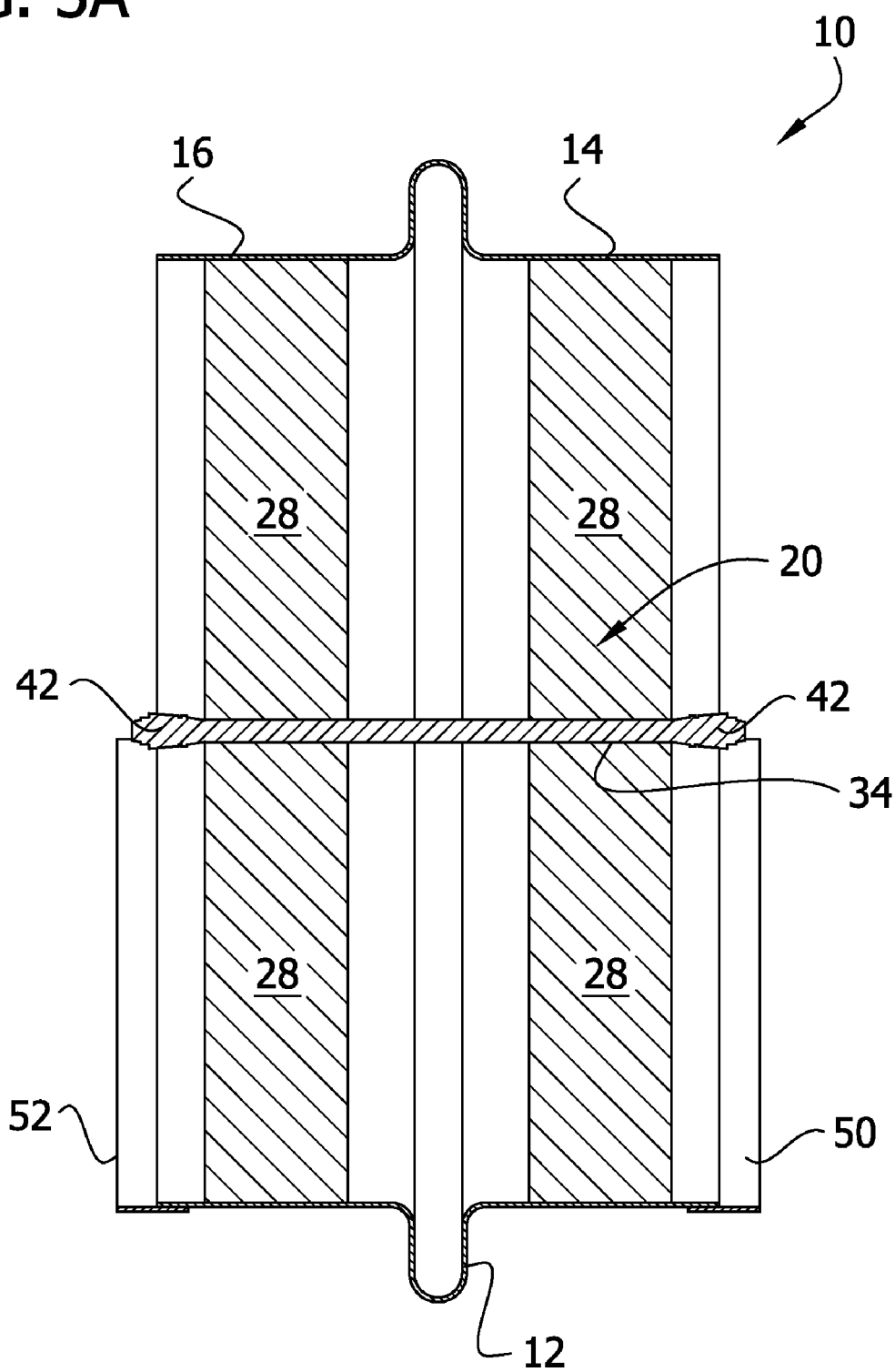

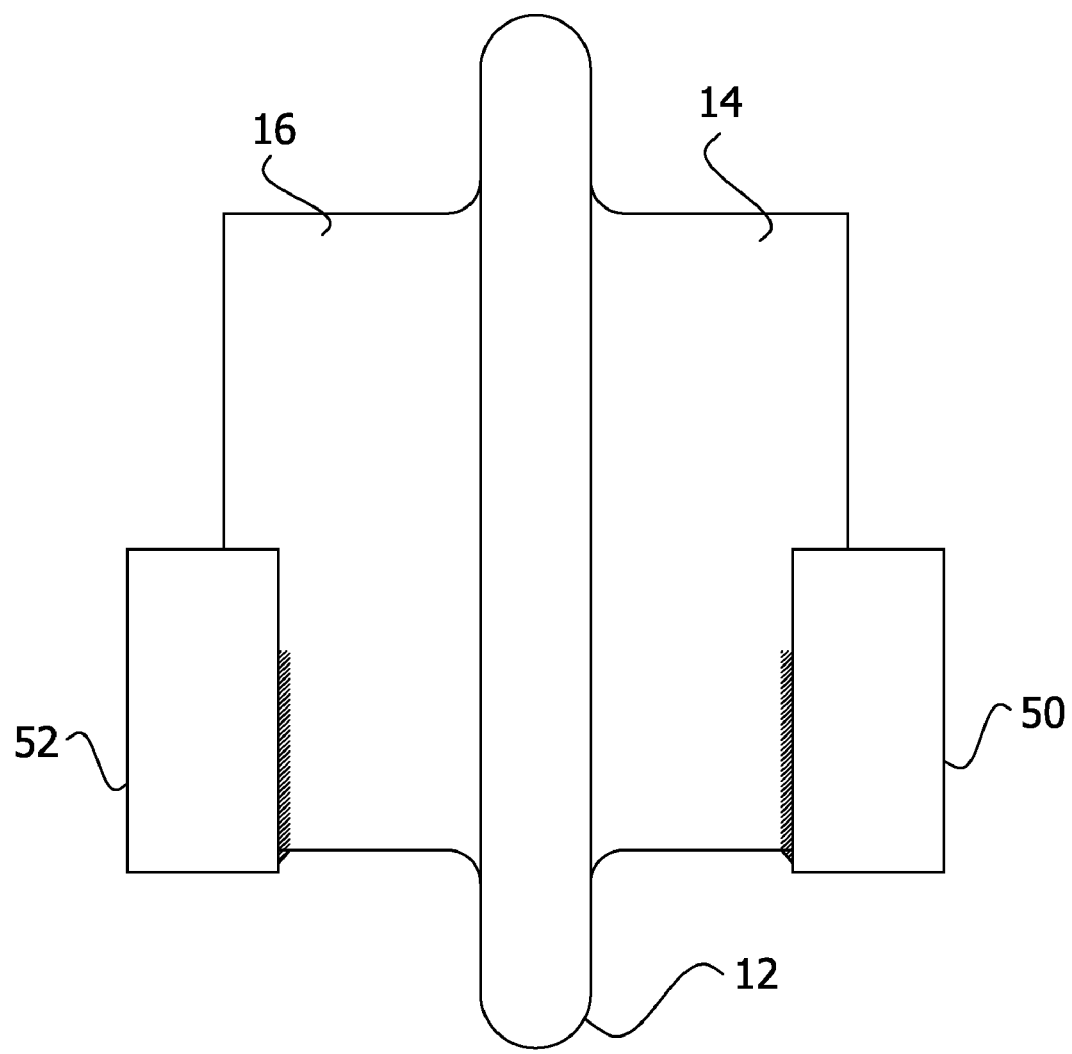

# EXPANSION JOINT FOR PIPE SYSTEM

CROSS-REFERENCE TO RELATED APPLICATIONS

The present application claims priority to U.S. Provisional Application No. 61/115,353, filed Nov. 17, 2008, which is herein incorporated by reference in its entirety.

FIELD OF THE INVENTION

The present invention generally relates to an expansion joint for a pipe system.

BACKGROUND

Expansion joints (also known as compensators) may be used in a pipe system to absorb axial, lateral and angular movements between pipes in the pipe system. In particular, expansion joints may be used to accommodate movement of the pipes due to thermal expansion of the pipes. One type of expansion joint, called a single unrestrained bellows expansion joint, consists of a bellows secured between two adjacent pipe sections. The bellows includes one or more convolutions to allow for bending or deflection of the joint. The expansion joint does not include any mechanism that contains or absorbs internal pressure thrust in the pipe system. That is, the single unrestrained bellows expansion joint does not include a mechanism or component that provides tensile support to prevent the expansion joint from pulling apart at the bellows due to internal pressure thrust.

Some other types of expansion joints include mechanisms that contain or absorb internal pressure thrust in the pipe system while allowing for limited angular movement or bending. A single hinged bellows expansion joint includes an external hinge or pivot that allows for angular movement in only one plane while absorbing internal pressure thrust. That is, the single hinged bellows expansion joint allows for single-directional movement while providing tensile support to prevent the expansion joint from pulling apart at the bellows due to internal pressure thrust. A gimbaled bellows expansion joint includes two external hinges that allow for angular movement in two planes while absorbing internal pressure thrust.

SUMMARY OF THE INVENTION

In one aspect, an expansion joint for a pipe system generally comprises a first pipe section defining a first passageway having a longitudinal axis, and a second pipe section defining a second passageway having a longitudinal axis. A deformable section interconnects the first and second pipe sections so that the first and second passageways are fluidly connected. The deformable section is constructed to deform upon relative movement of the first and second pipe sections with respect to each other. A first mount is secured to the first pipe section in the first passageway, and a second mount is secured to the second pipe section in the second passageway. A flexible tension member tethers the first and second mounts to each other. The flexible tension member extends through the deformable section.

BRIEF DESCRIPTION OF THE DRAWINGS

FIG. 5A is a longitudinal section of the expansion joint taken along the line 5A-5A in FIG. 3;

FIG. 6 is a side elevational view of the expansion joint;

Corresponding reference characters indicate corresponding parts throughout the drawings.

DETAILED DESCRIPTION OF THE DRAWINGS

Figure 1:
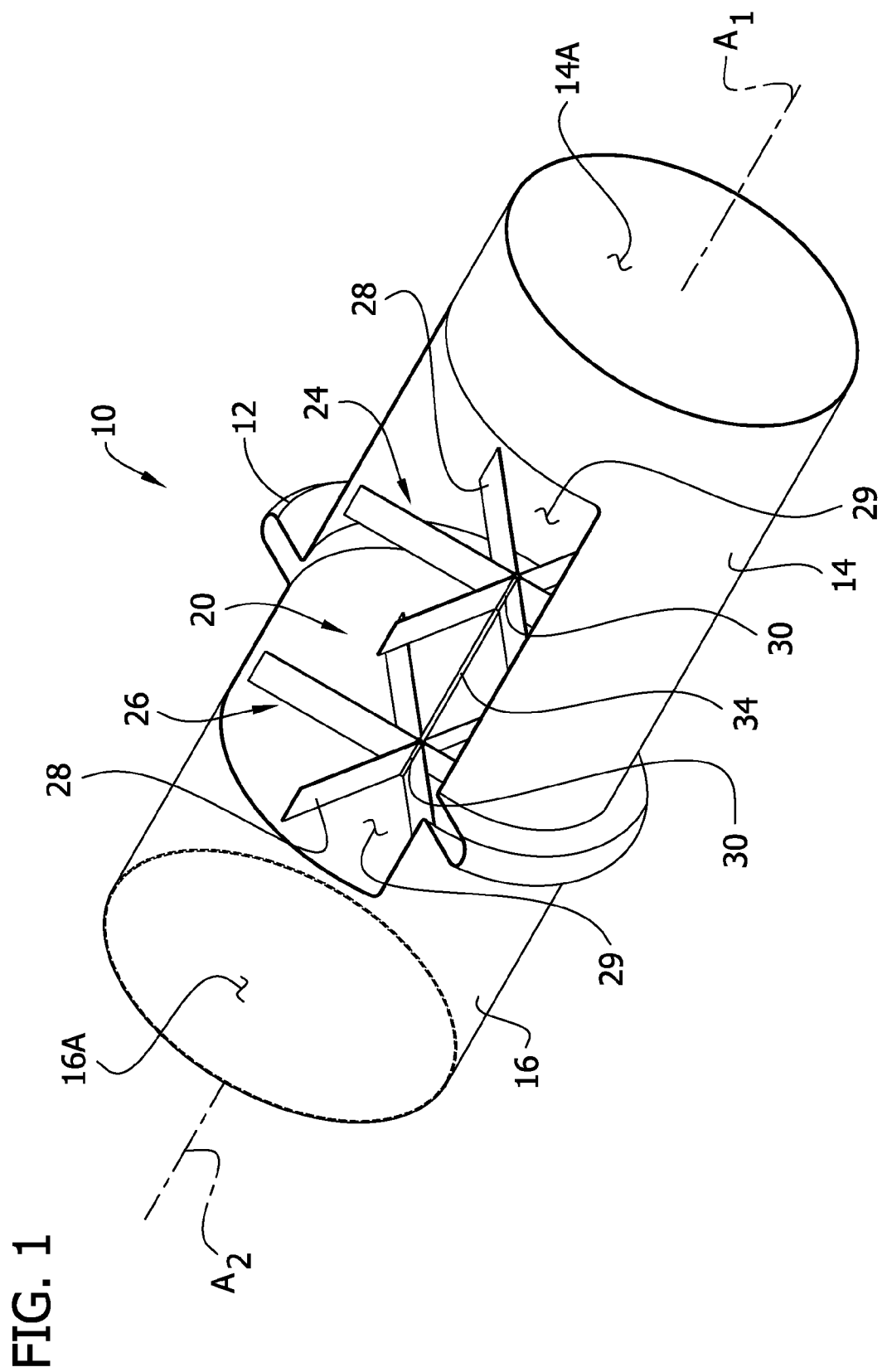
FIG. 1 is a perspective of a first embodiment of an expansion joint for a pipe, a portion of which is removed to show internal components.

Referring to the drawings, one embodiment of an expansion joint for a pipe system (i.e., two or more pipes) is generally indicated at 10. The expansion joint includes a bellows 12 (broadly, a deformable section), defining a bellows segment of the joint, interconnecting first and second pipe sections 14, 16, respectively. The first pipe section 14 defines a first passageway 14A having a longitudinal axis $A_1$ and the second pipe section 16 defines a second passageway 16A having a longitudinal axis $A_2$. The bellows 12 connects the respective first and second passageways 14A, 16A in fluid communication with one another. The first and second pipe sections 14, 16 and the bellows 12 may be constructed from metal, such as stainless steel. The specifications of the pipe sections 14, 16, including the interior and exterior diameters of the respective pipe sections, and the specifications of the bellows 12 depend on a specific application of the pipe system and use of the expansion joint 10. In the illustrated embodiment, the bellows 12 includes a single convolution. The bellows 12 may include more than one convolution without departing from the scope of the present invention.

The expansion joint 10 includes a tension assembly, generally indicated at 20, to allow for multi-planar bending of the expansion joint at the bellows 12 while providing tensile support. The tension assembly 20 includes a flexible tension member 22 (FIG. 2) secured to first and second mounts, generally indicated at 24, 26, respectively, in the respective first and second pipe sections 14, 16. In the illustrated embodiment, the tension member 22 is generally coaxial with the first and second passageways 14A, 16A. Each of the first and second mounts 24, 26 includes a plurality of braces 28 extending radially from a hub 30 to respective walls of the first and second pipe sections 14, 16. In other words, the braces 28 extend generally transversely with respect to the first and second passageways 14a, 16A. Longitudinal spaces or openings 29 between adjacent braces 28 allow fluid (e.g., gas) to flow past the mounts 24, 26, as will be explained below. In the illustrated embodiment, each hub 30 is generally tubular (broadly, hollow) defining a passage, and the braces 28 are spaced equally around an exterior of the hub. Each mount 24, 26 includes six braces 28, each of which is generally shaped as an elongate plate or blade having a thickness T that extends generally transversely with respect to the corresponding longitudinal axes $A_1, A_2$ of the pipe sections 14, 16. The hub 30 and the braces 28 of each mount 24, 26 may be formed separately and secured together, such as by welding, to form the respective mounts, although it is contemplated that the hub and the braces of each mount may be formed as an integral structure without departing from the scope of the invention. The hub 30 and the braces 28 of each mount 24, 26 may be formed from metal, such as stainless steel, although the hub and the braces may be formed from other material, such as plastic, without departing from the scope of the present invention. Moreover, the configuration of the hubs, including the number and shape of the braces, may be other than illustrated.

Figure 2:
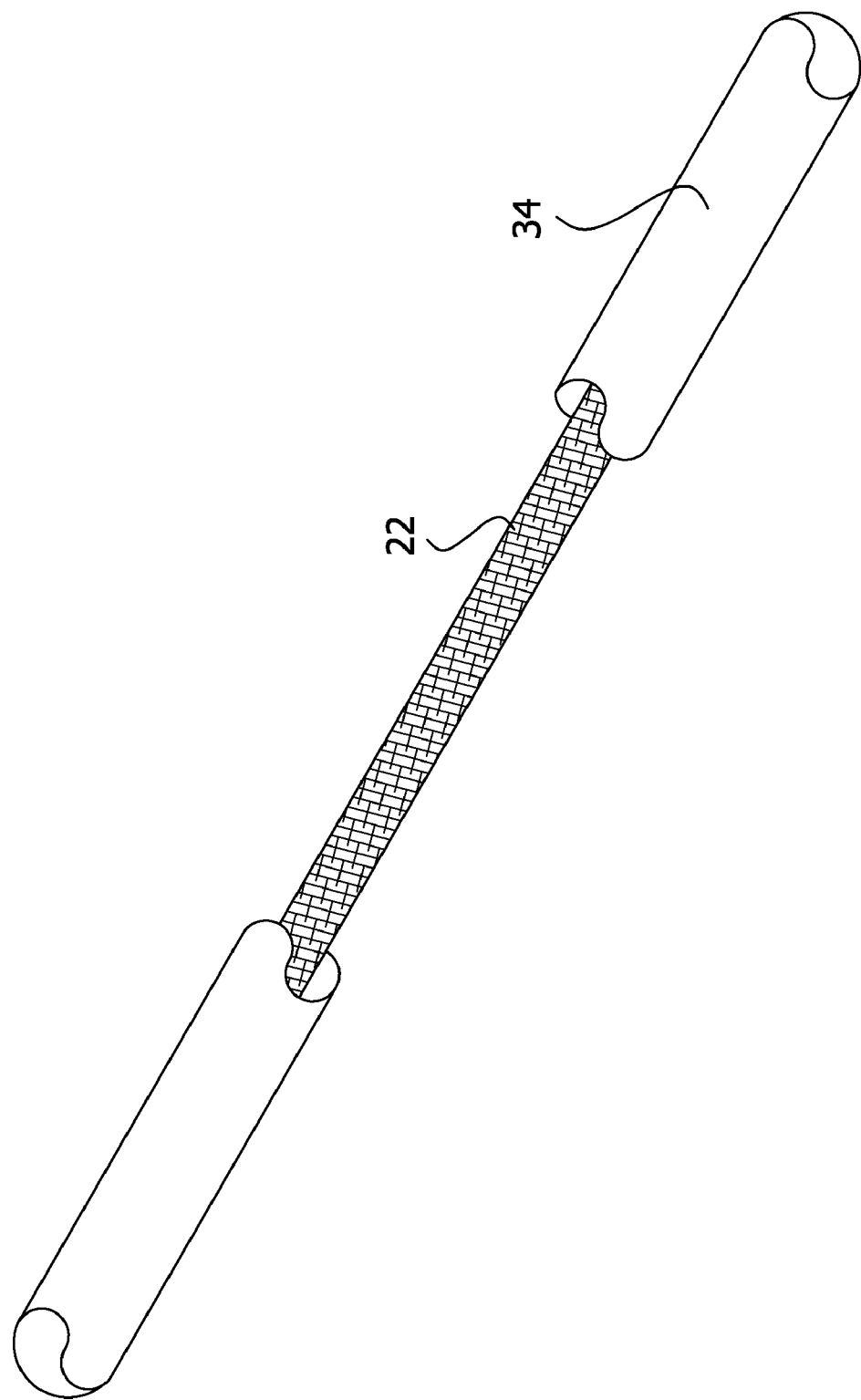
FIG. 2 is an enlarged view of a compression member received over a tension member of the expansion joint, a portion of the compression member being removed to show the tension member.
Figure 5B:
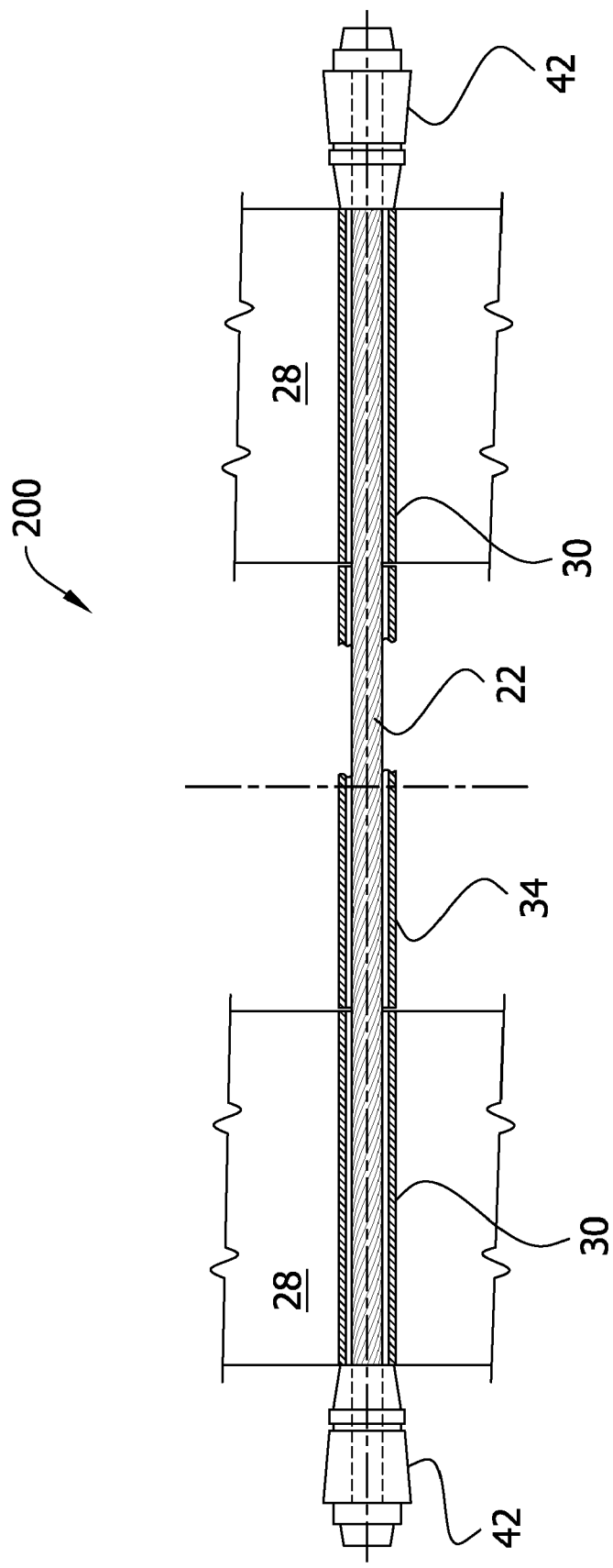
FIG. 5B is an enlarged fragmentary view of FIG. 5A illustrating the tension member.
Figure 7:
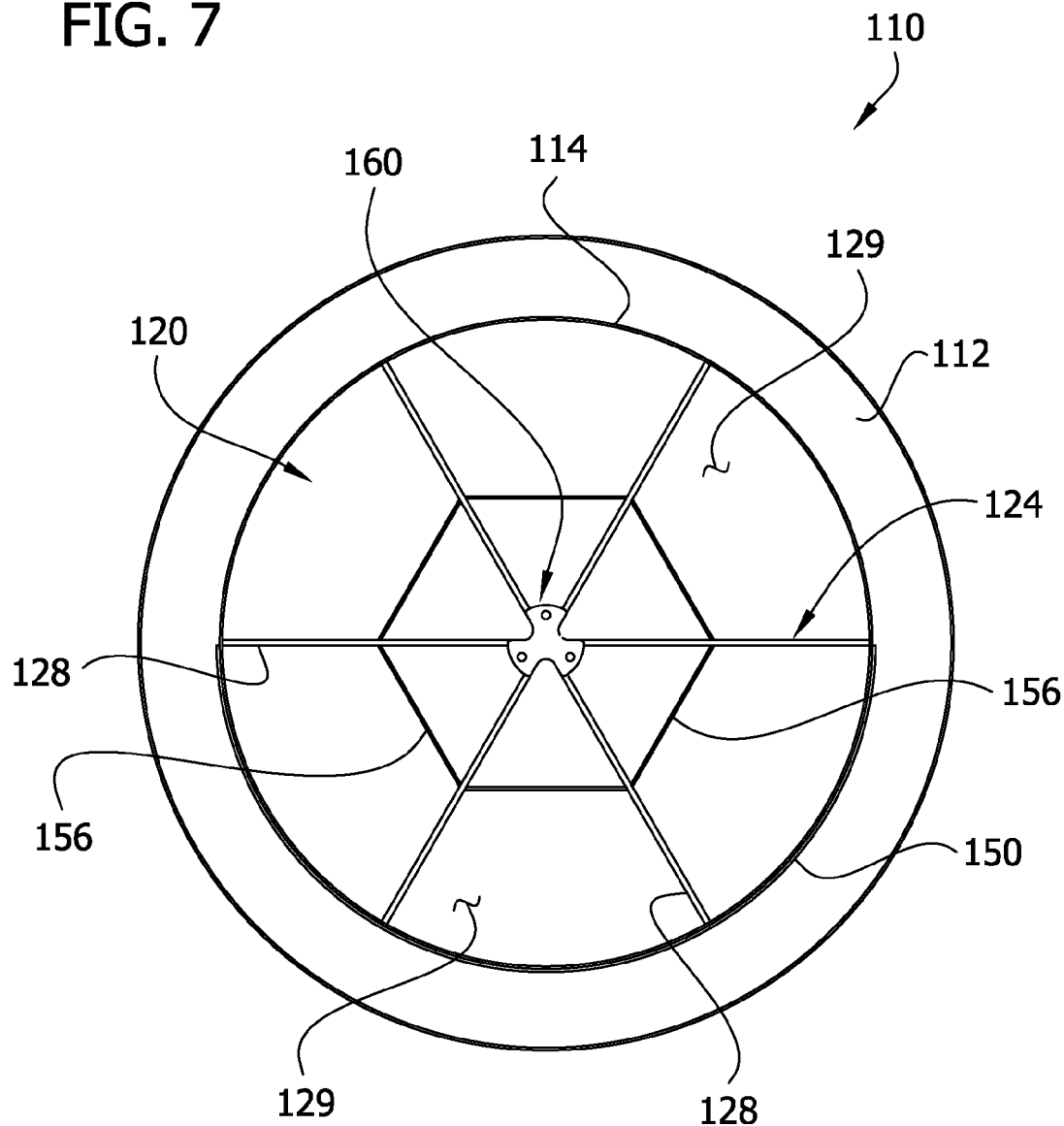
FIG. 7 is a right end view of a second embodiment of an expansion joint for a pipe.

Referring to FIG. 2, the flexible tension member 22 of the illustrated embodiment comprises a cable, such as a stainless steel wire rope. The tension member 22 may have other constructions without departing from the scope of the present invention. The tension member 22 is secured in the hollow hubs 30 of the first and second mounts 24 and extends through the bellows segment of the expansion joint 10. The tension member 22 thus tethers the mounts 24, 26 to each other, limiting their maximum separation, but providing substantially no restriction to other relative movement of the mounts. In the illustrated embodiment, the tension member 22 extends through each of the hubs 30, and opposite ends of the tension member are swaged. The tension member 22 may also be welded to an outside of the hub 30. Other ways of securing the tension member 22 to the hubs 30, such as securing stops to the opposite ends of the tension member to prevent the tension member from being withdrawn from the hubs, do not depart from the scope of the present invention. For example, referring to FIG. 5B, swage terminals 42 are secured to the opposite ends of the tension member 22 to secure the tension member to the first and second mounts 24, 26. Other ways of securing the tension member 22 to the mounts 24, 26 do not depart from the scope of the present invention. The tension member 22 may be secured to the mounts 24, 26 in other ways.

A compression member 34, formed as a generally rigid, tubular sleeve, is received over the tension member 22 between the first and second mounts 24, 26. The compression member 34 may be formed from stainless steel, although it may be formed from other materials without departing from the scope of the present invention. The compression member 34 is generally free-floating on the tension member 22 in that the compression member is free from fixed securement to the tension member and the hubs 30. Longitudinal movement of the compression member 34 along the tension member 22 is limited by the hubs 30. The compression member 34 may be fixedly secured to the tension member 22 without departing from the scope of the present invention. In the illustrated embodiment, a length of the compression member 34 is less than a distance between the hubs 30 to allow bending or flexing in any direction of uncovered portions of the tension member 22 located between opposite longitudinal ends of the compression member and the hubs. It is understood that an expansion joint may omit a compression member without departing from the scope of the present invention.

It is contemplated that the compression member 34 and the tension member 22 may be operatively connected or constructed in other ways within the scope of the present invention. For example, the compression member may comprise a solid bar and the tension member may comprise two tension elements secured, such as by welding, to opposite ends of the bar. Other ways of operatively connecting or constructing the compression member and the tension member do not depart from the scope of the present invention.

Figure 4:
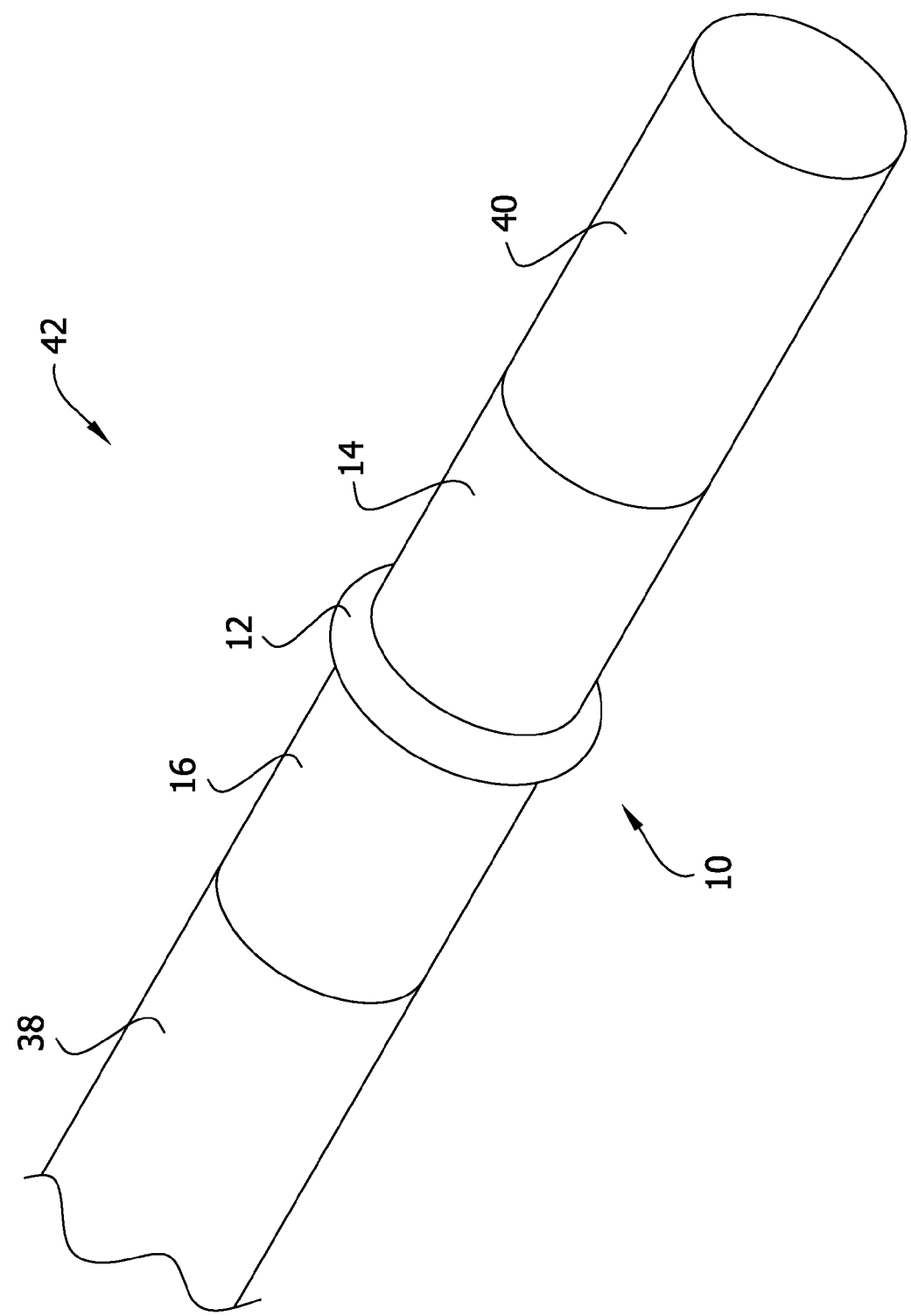
FIG. 4 is a schematic perspective of a pipe system including the expansion joint of FIG. 1.

Referring to FIG. 4, in use the expansion joint 10 is secured to adjacent pipes 38, 40 in a pipe system, generally indicated at 42, to allow for relative movement between the adjacent pipes. In one example, the expansion joint 10 includes arcuate splice plates 50, 52 (FIGS. 5A-6) to secure the expansion joint 10 to the adjacent pipes 38, 40. The arcuate splice plates 50, 52 are secured to exteriors of first and second pipe sections 14, 16, such as by welding, and extend around majorities of lower halves of the respective pipe sections. The splice plates 50, 52 overhang longitudinal ends of the respective first and second pipe sections 14, 16. To secure the pipes 38, 40 to the extension joint 110, the pipes are abutted against the respective longitudinal ends of the pipe sections 14, 16 so that the splice plates 50, 52 cradle the lower halves of the respective pipes 38, 40. The lower halves of the pipes 38, 40 are then welded to the splice plates 50, 52. Similar splice plates (not shown) on the respective pipes 38, 40 are welded to the first and second pipe sections 114, 116. Other ways of securing the expansion joint 10 to the adjacent pipes 38, 40 do not depart from the scope of the present invention.

In one example, the pipe system 42 may be used at a processing plant to transfer gaseous fluid, such as $SO_2$, within the plant. The flexible tension member 22 allows for bending or deflection in all directions at the bellows 12 to absorb expansion or other movement of the pipes in the pipe system 42 while, at the same time, providing tensile support so that the expansion joint does not pull apart at the bellows when it is subjected to an internal thrust load. Moreover, the compression member 34 provides compression support so that the expansion joint does not completely collapse at the bellows 12. In the illustrated embodiment, the tension assembly 20 does not provide any substantial biasing force to bias the joint 10 in a selected configuration (e.g., a linear configuration).

In theory, the mounts 24, 26 of the illustrated embodiment equally distribute tensile forces acting on the tension member 22 in use. More specifically, the tensile forces acting on the tension member 22 and the compression forces acting on the compression member 34 are distributed substantially equally among each of the radially spaced braces 28 due in part to the fact that a longitudinal axis of the tension member $A_3$ is generally centered in the first and second passageways 14A, 16A (i.e., the first and second passageways and the tension member are generally coaxial).

Figure 3:
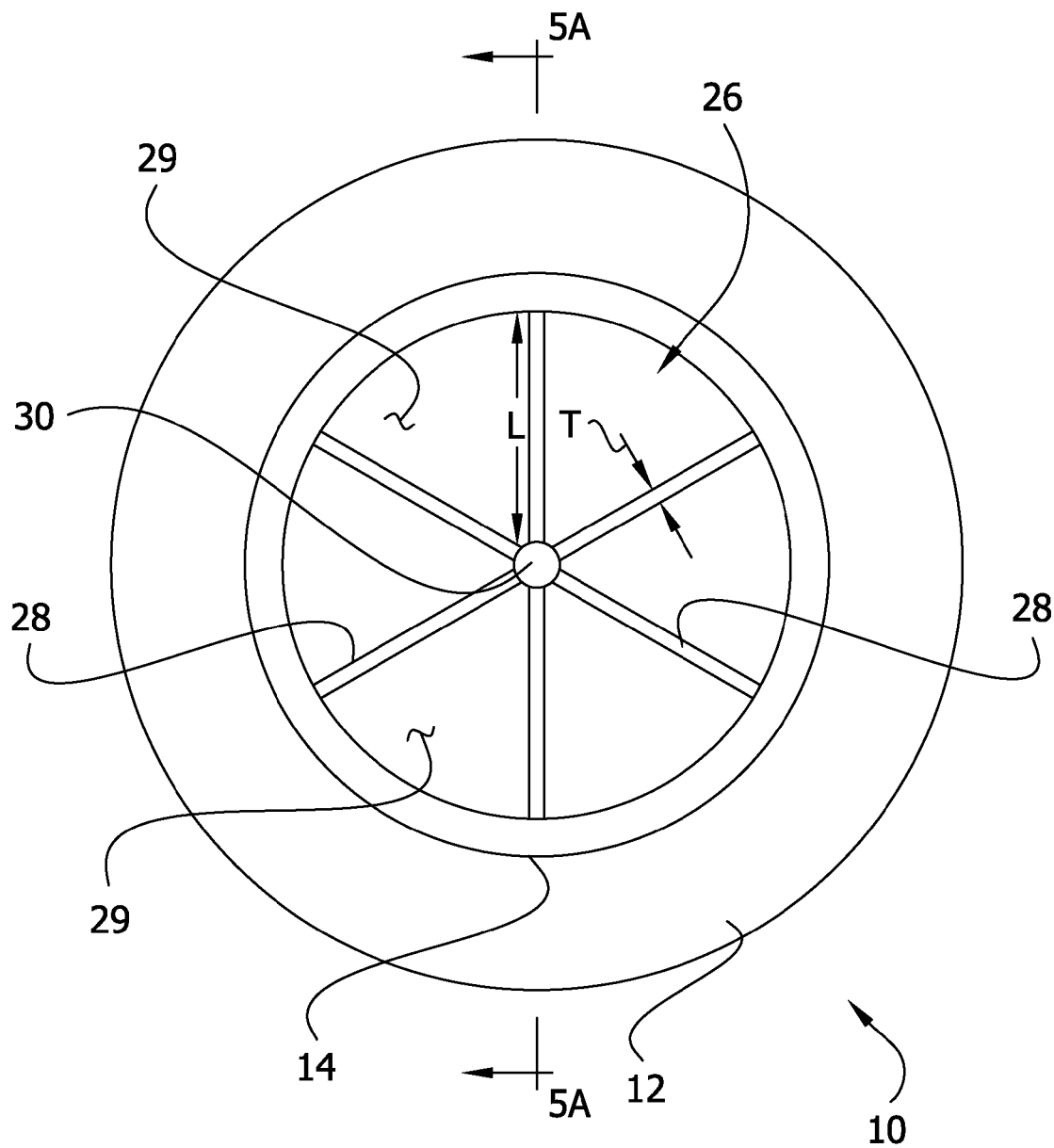
FIG. 3 is an enlarged schematic end view of the expansion joint.

Moreover, as shown in FIG. 3, each of the mounts 24, 26 of the illustrated embodiment has a percentage of effective open area that does not significantly impede the flow of gas past the mount and does not cause a significant pressure drop as the gas flows past the mount. As used herein, the "percentage of effective open area" of each mount 24, 26 is the total open area of the corresponding mount taken from the viewpoint of the flow of gas in the pipe system 42 (see FIG. 3) divided by the total cross-sectional area of a portion of the passageway in which the mount is located. As an example and referring to FIG. 3, where the pipe section has a uniform inner diameter of 2.44 m (8 ft), the joint has a uniform external diameter of 3.0 mm (10 ft), and each brace has a length of the uniform diameter 1.22 m (4 ft) and a uniform thickness of 20 mm (¾in), the percentage of effective open area equals 96%. The mounts 24, 26 may have other percentages of effective open area without departing from the scope of the present invention. In one embodiment, it is contemplated that each mount 24, 26 has a percentage of effective open area that is within a range from about 95% to about 97%.

Further, the compression member 34 on the tension member 22 provides compressive support to the expansion joint 10 so that internal compressive forces do not completely collapse the bellows 12. Axial forces tending to collapse the bellows 12 cause the mounts 24, 26 to move toward each other. This is permitted to the extent of the difference between the maximum separation of the mounts 24, 26 and the length of the compression member 34. Once the separation of the mounts 24, 26 equals the length of the compression member 34, the compression member engages the hubs 30 of the mounts 24, 26 and resists further convergence of the mounts and thereby further collapse of the bellows 12. As described above, the compression member 34 does not prevent bending or flexing of the expansion joint 10.

Referring to FIGS. 7-19, a second embodiment of the expansion joint for a pipe system (i.e., two or more pipes) is generally indicated at 110. Like the first embodiment, the expansion joint 110 includes a bellows 112 (broadly, a deformable section), defining a bellows segment of the joint, interconnecting first and second pipe sections 114, 116, respectively. The expansion joint 110 also includes a tension assembly, generally indicated at 120, to allow for multi-planar bending of the expansion joint 110 at the bellows 112 while providing tensile support. Similar to the first embodiment, the tension assembly 120 in the third embodiment includes first and second mounts, generally indicated at 124, 126, respectively, in respective first and second pipe sections 114, 116. Each of the first and second mounts 124, 126 includes a plurality of braces 128 extending radially from an imaginary axis of the expansion join 110 to respective walls of the first and second pipe sections 114, 116. The dimensions and arrangement of the braces 128 may be similar or the same as the first embodiment or may be different without departing from the scope of the present invention.

Figure 9:
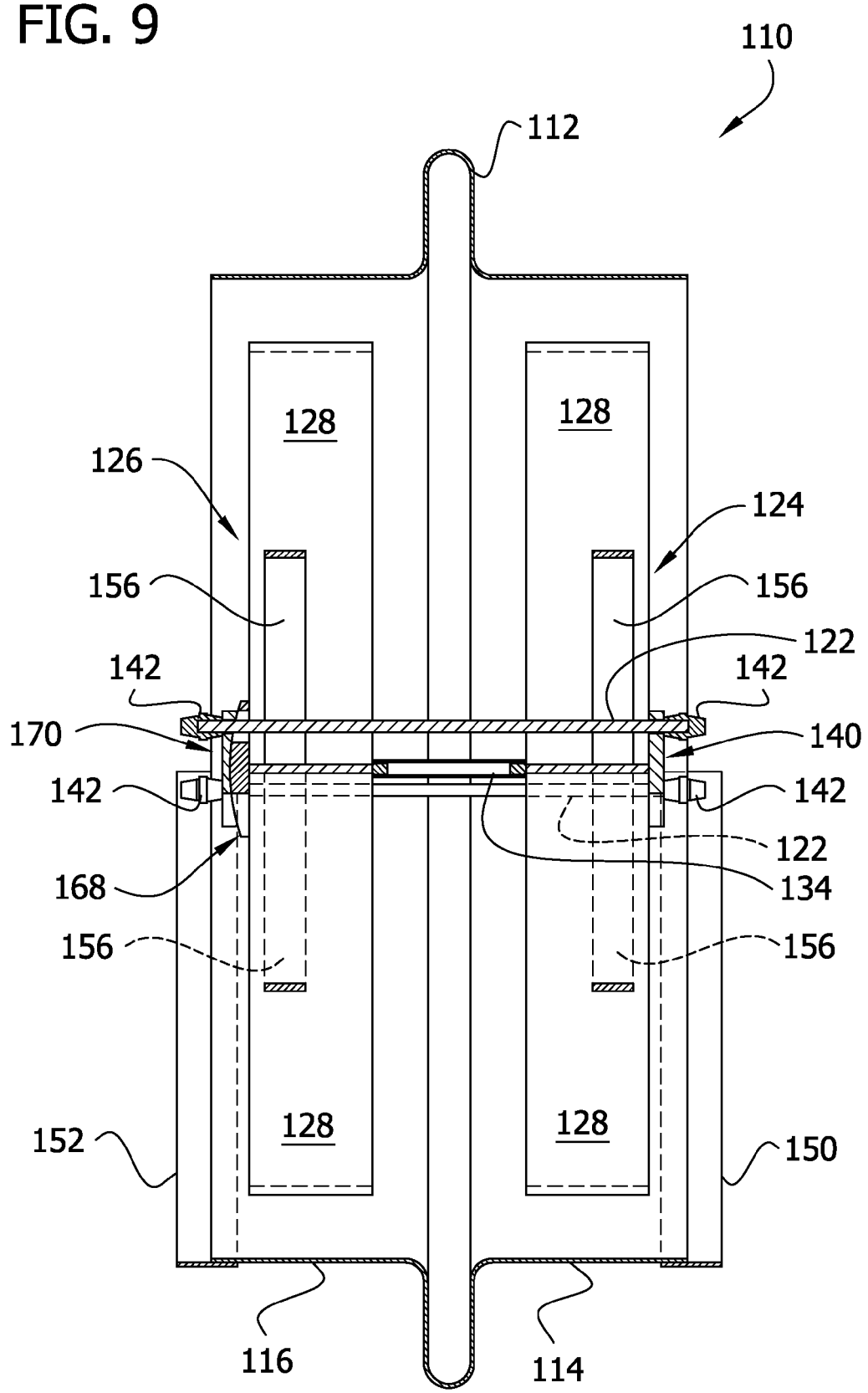
FIG. 9 is a longitudinal section of the expansion joint taken along the line 9-9 in FIG. 9.
Figure 10:
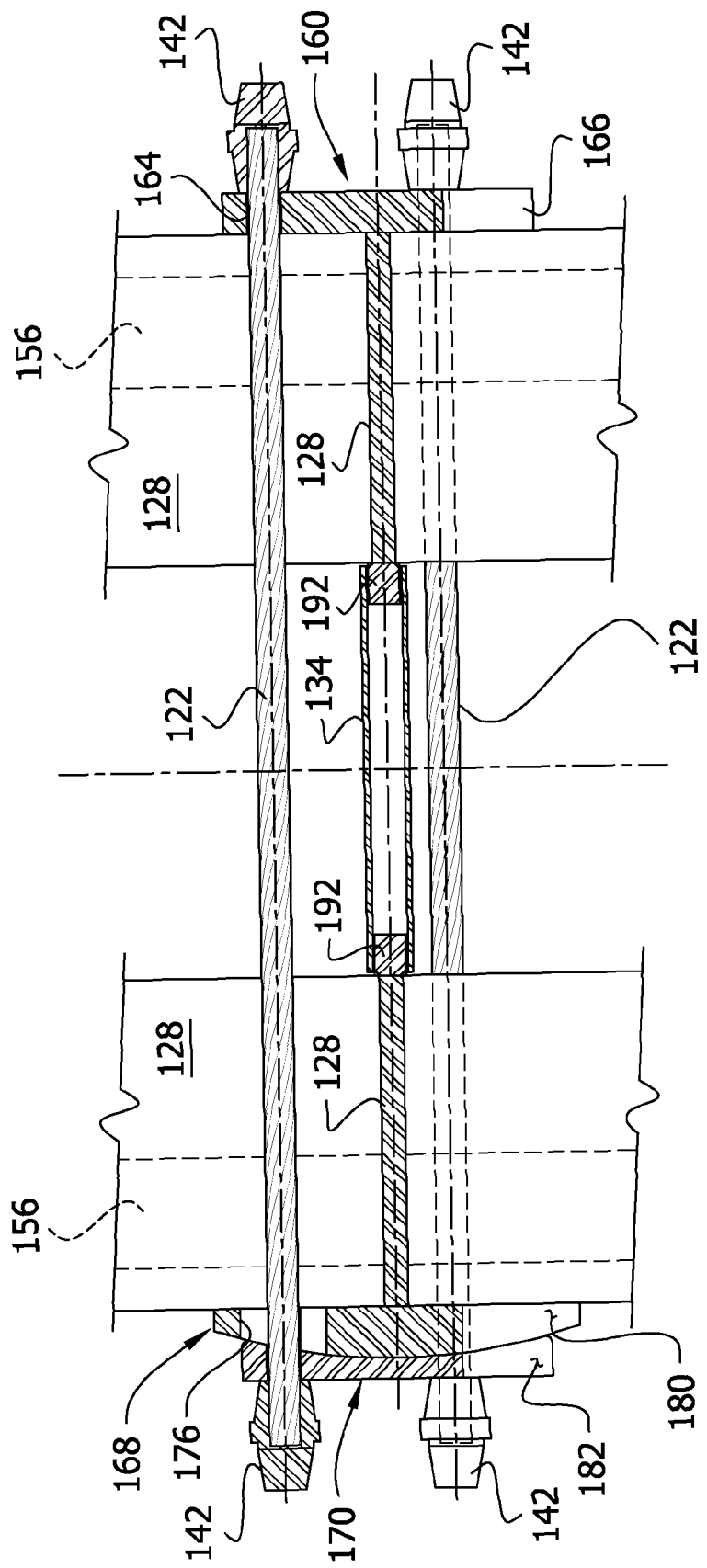
FIG. 10 is an enlarged fragmentary view of FIG. 9 illustrating two tension members attached to a compression member.
Figure 11:
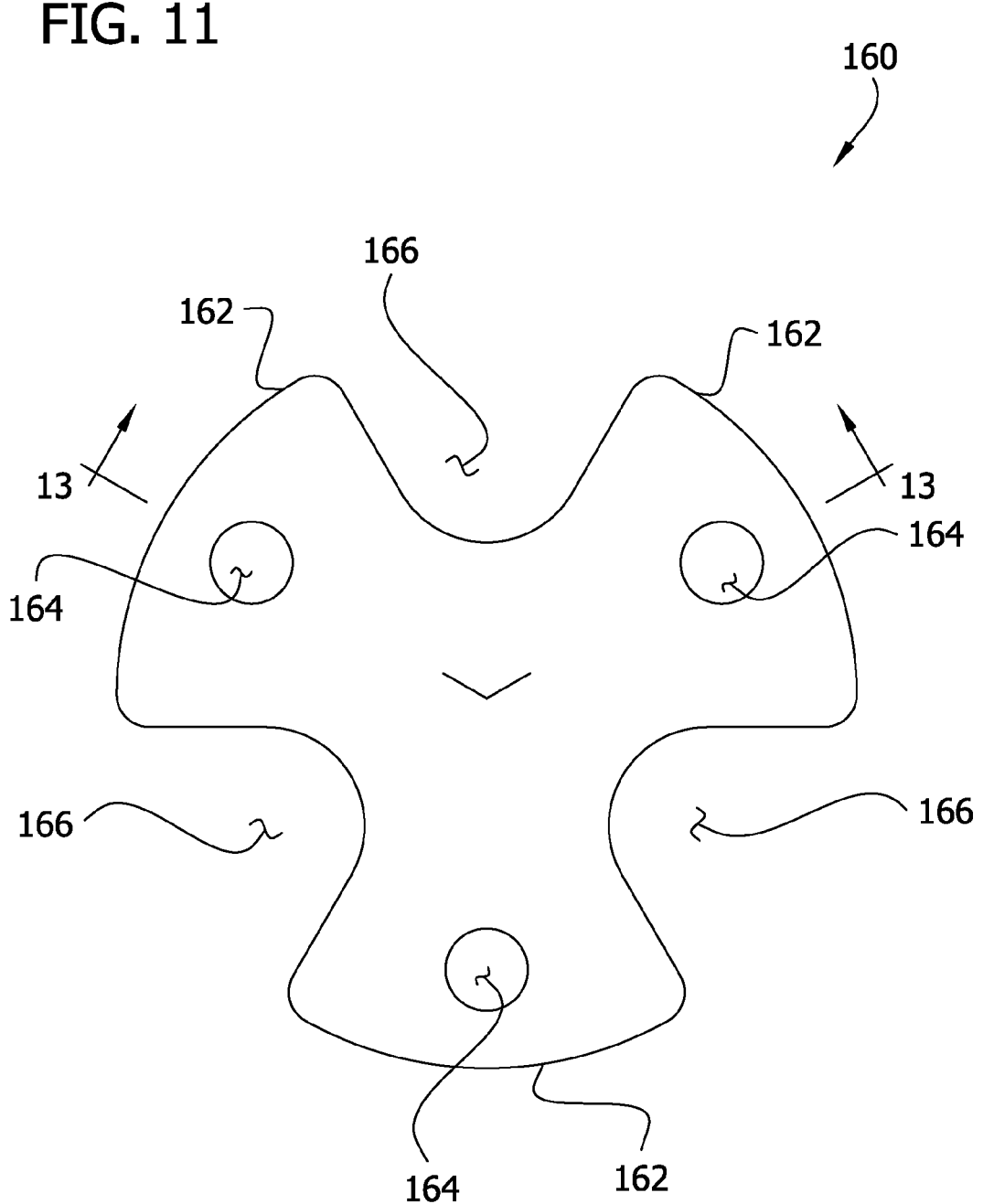
FIG. 11 is a plan view of a fixed securement plate.

Unlike the first embodiment, however, the present expansion joint 110 includes a plurality of flexible tension members 122 (e.g., three cable ropes, such as described above with respect to the first embodiment) and a compression member 134 (e.g., a single compression member) secured and extending between the mounts 124, 126 (see, FIGS. 9 and 10). The expansion joint 110 also includes stiffening members 156 in the form of plates secured to and extending between adjacent braces 128 of each of the first and second mounts 124, 126. The stiffening members 156 may be formed from stainless steel and secured to the braces 128 by welding or in other ways. It is envisioned that this expansion joint 110 may be used in a piping system in lieu of the first embodiment (i.e., an expansion joint with a single tension member) when load conditions in the piping system exceed those of a single tension member.

Figure 12:
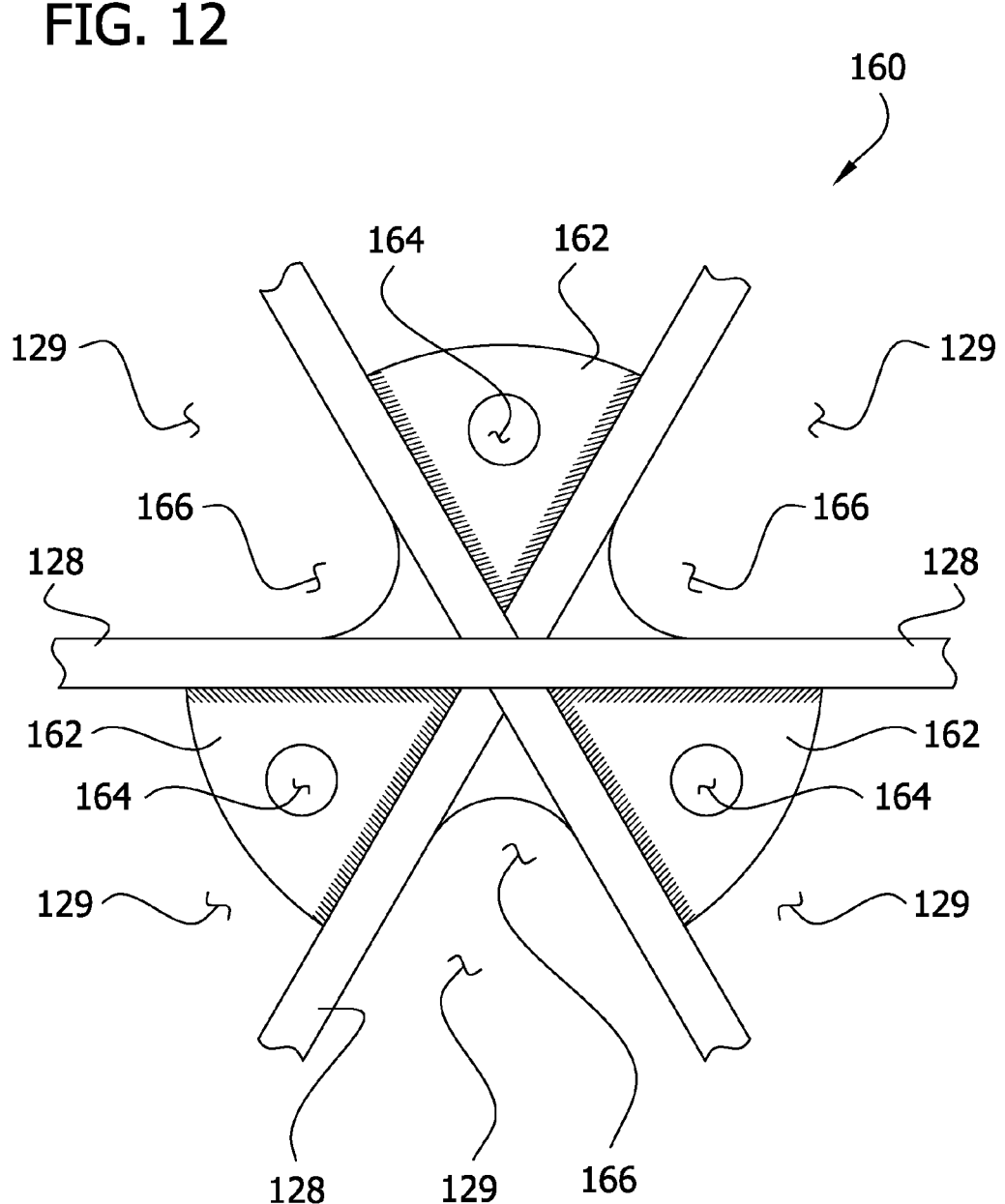
FIG. 12 is a plan view of the fixed securement plate welded to braces of a first mount.
Figure 13:
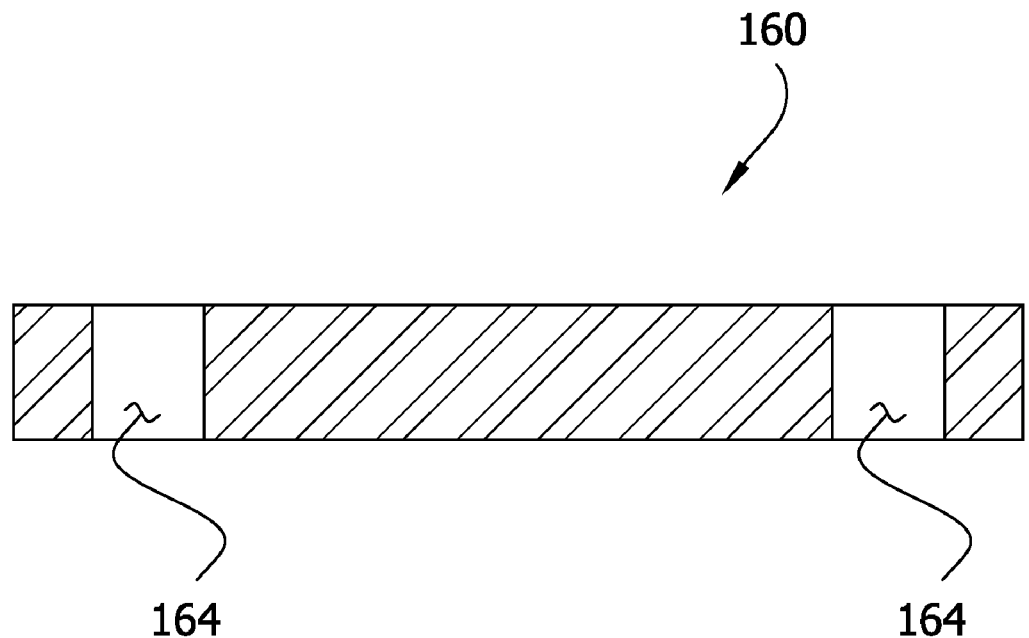
FIG. 13 is a sectional view of the fixed securement plate taken along the line 13-13 in FIG. 11.
Figure 14:
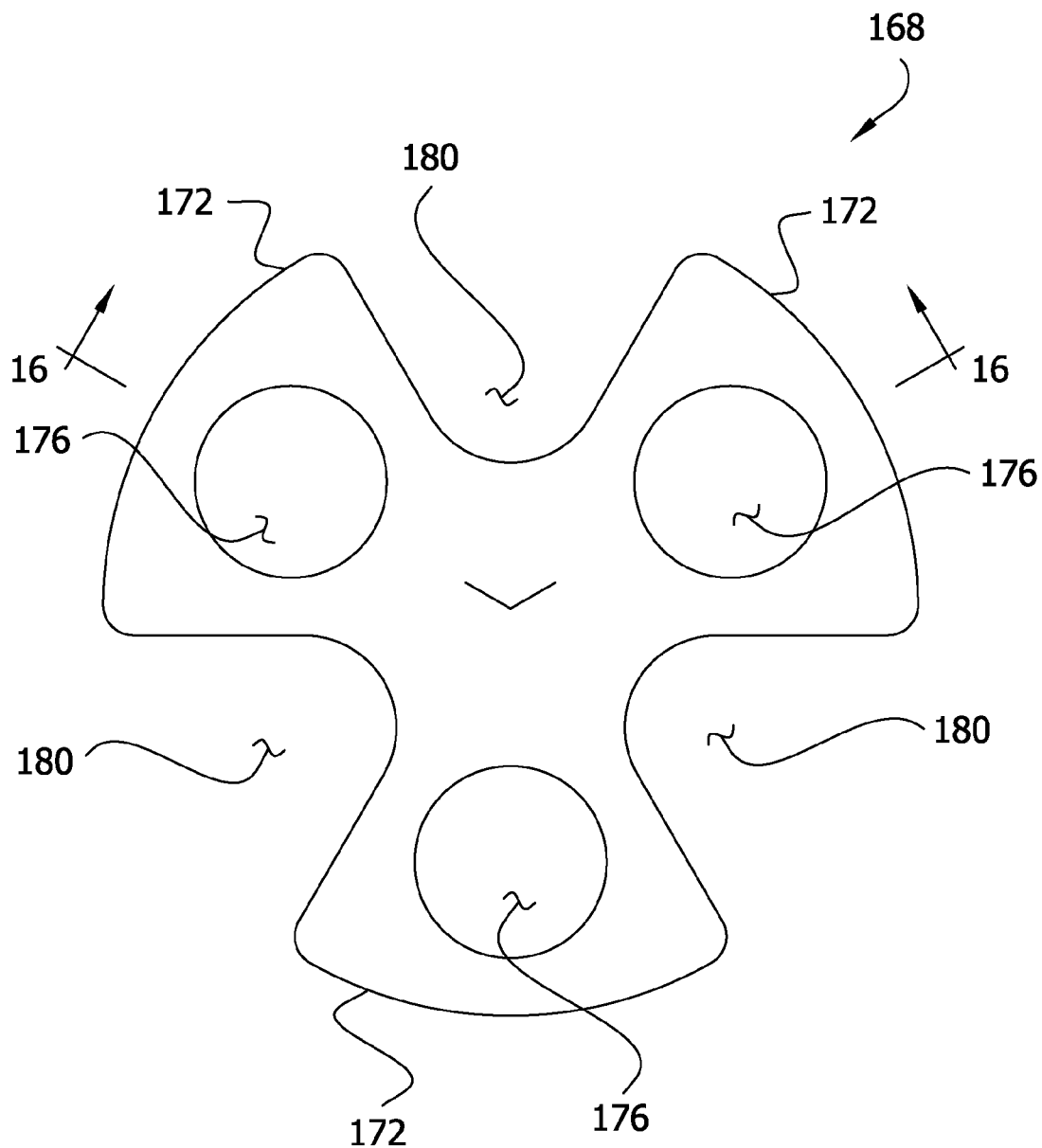
FIG. 14 is a plan view of a base securement plate.
Figure 15:
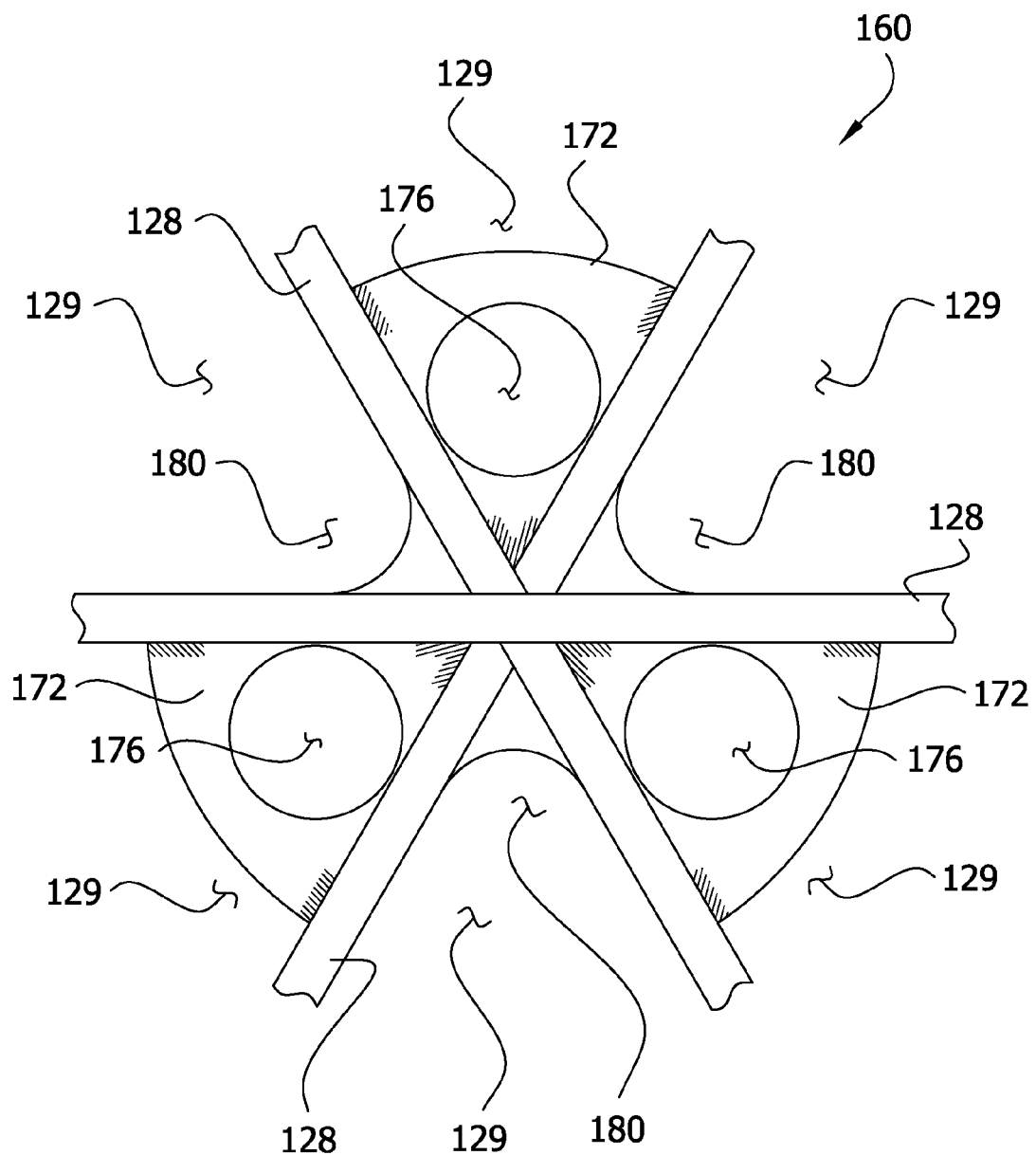
FIG. 15 is a plan view of the base securement plate welded to braces of a second mount.
Figure 16:
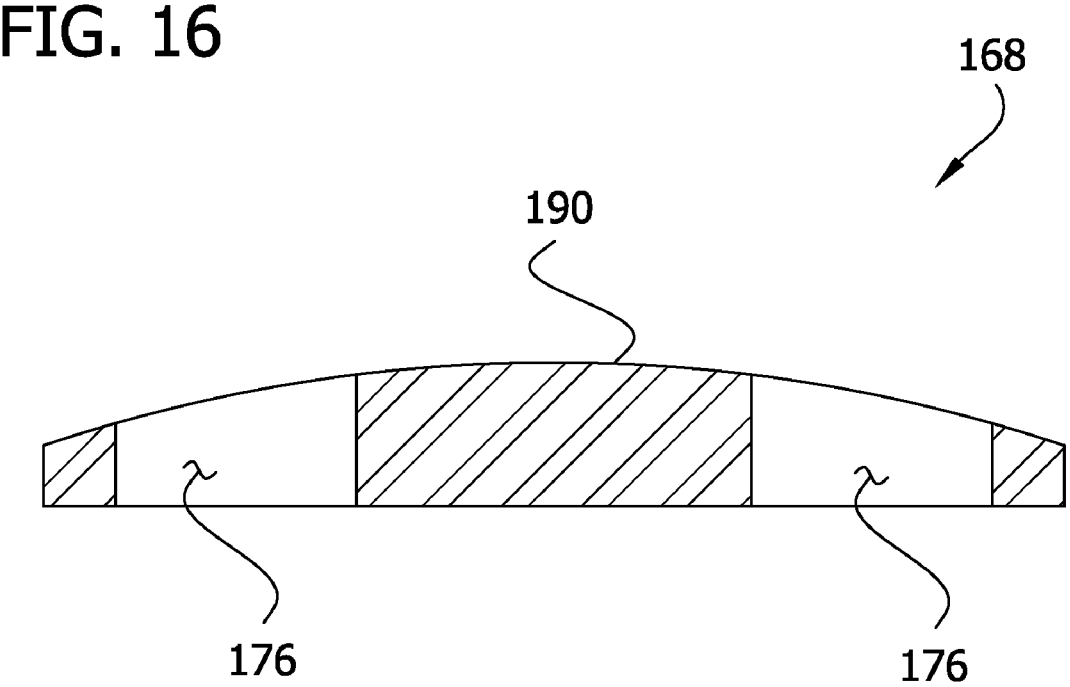
FIG. 16 is a sectional view of the base securement plate taken along the line 16-16 in FIG. 14.
Figure 17:
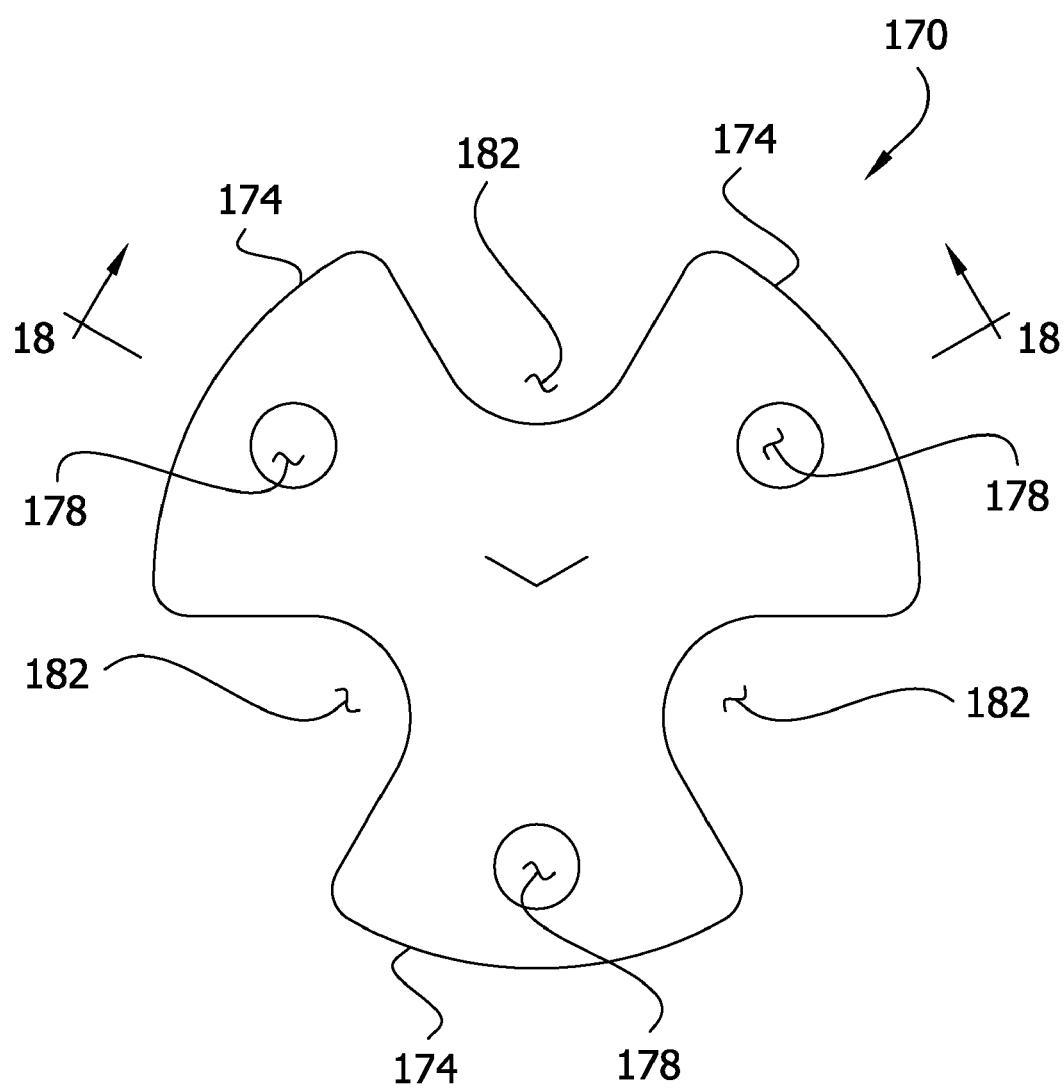
FIG. 17 is a plan view of a sliding securement plate.
Figure 18:
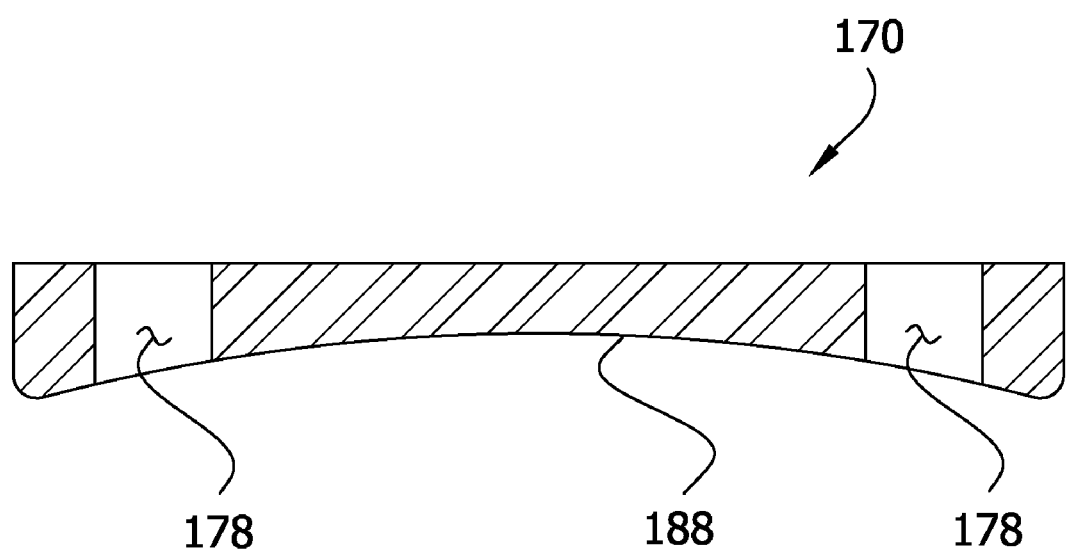
FIG. 18 is a sectional view of the sliding securement plate taken along the line 18-18 in FIG. 17.

Referring to FIGS. 7-10, the first and second mounts 124, 126 include securement plates attached to the respective non-adjacent faces of the braces 128. As explained below, the securement plates are used to secure the tension members 120 to the mounts 124, 126. In the illustrated embodiment, the first mount 124 includes a fixed securement plate, generally indicated at 160, secured to the braces 128 of the first mount 124, such as by welding. As shown best in FIGS. 11 and 12, the fixed securement plate 160 includes three radial extensions 162 extending radially outward from a center of the plate. Each extension 162 includes an opening 164 for receiving an end margin of one of the three tension members 122. Swage terminals 142 are attached to the ends of the tension members 122 to secure the tension members to the securement plate 160. The openings 164 have centers that are spaced from one another around the center of the plate 160 at about 120 degree intervals. As shown in FIG. 12, through this arrangement each opening 164 is aligned longitudinally with one of the longitudinal spaces 129 between adjacent braces 128 so that each of the tension members 120 extends through one of the respective longitudinal spaces into the respective opening in the securement plate 160. As also shown in FIG. 12, gaps 166 between adjacent extensions 162 are generally aligned with the other longitudinal spaces 129 so as not to impede fluid flow through the respective spaces.

Figure 8:
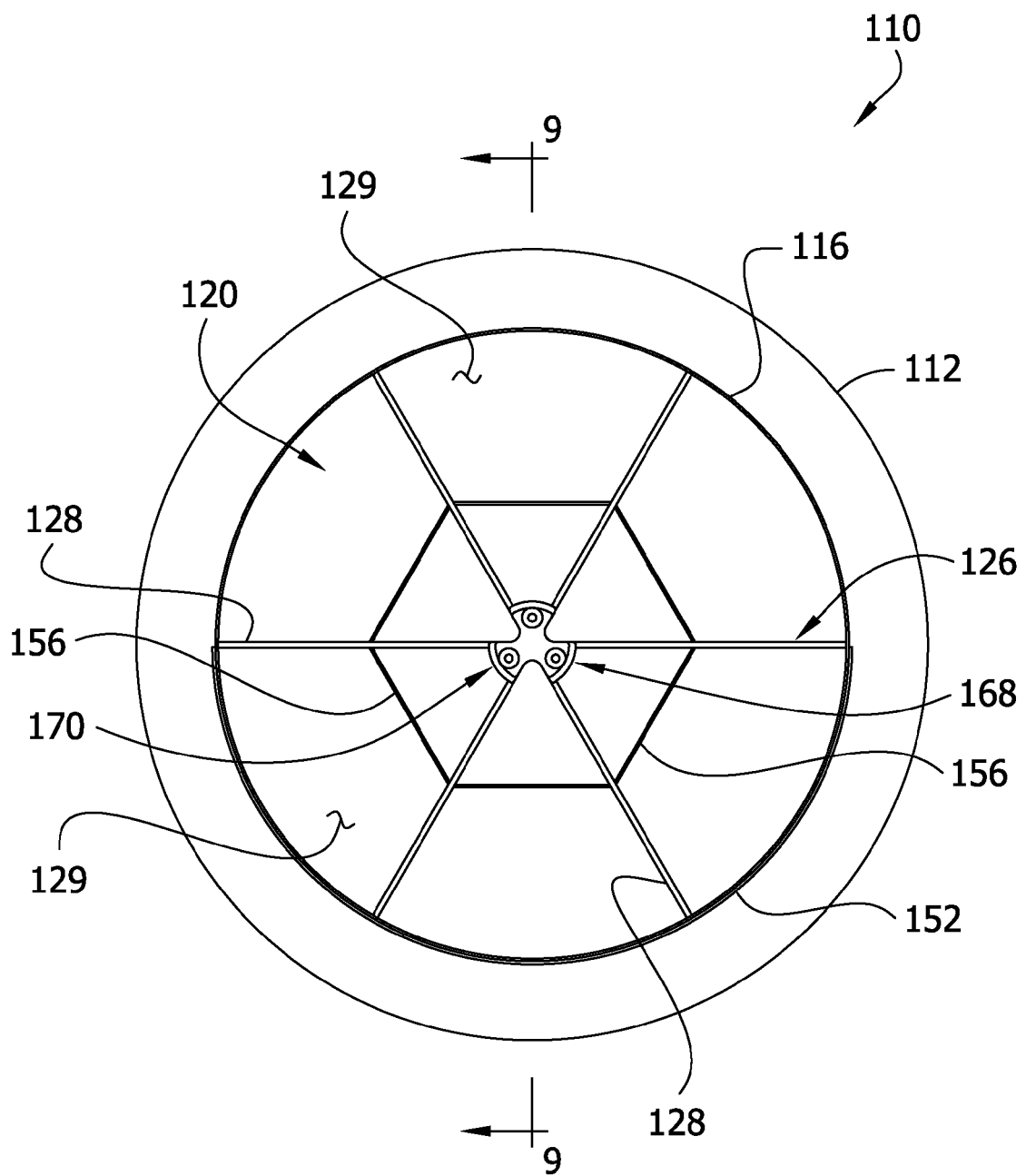
FIG. 8 is a left end view of the expansion joint.

Referring to FIGS. 8-10, the second mount 126 includes articulating securement plates, including a base securement plate, generally indicate at 168, secured (e.g., welded) directly to the braces 128 of the second mount 126 and a sliding securement plate, generally indicated at 170, which is in sliding engagement with the base securement plate. The base and sliding securement plates 168, 170 are similar to the fixed securement plate 160 in that both plates include three radial extensions 172, 174, respectively, extending radially outward from a center of the plate, and each of the extensions includes an opening 176, 178, respectively. The centers of the openings 176, 178 are spaced around the center of the corresponding plate 168, 170 at about 120 degree intervals. As shown in FIG. 10, openings 176 in the sliding plate 170 are aligned with respective openings 178 in the base plate 168, and the aligned openings are also aligned with one of the longitudinal spaces 129 between adjacent braces 128 of the second mount 126 so that each of the tension members 120 extends through one of the respective longitudinal spaces into the respective openings in the base plate and the sliding plate.

For reasons explained in more detail below, the openings 176 in the base securement plate 168 (FIG. 14) have diameters that are substantially larger than the cross-sectional diameters of the tension members 122 to allow for radial movement of the tension members in the respective openings, and the openings 178 in the sliding plate 170 have diameters only slightly larger than the diameters of the tension members so that the tension members fit snugly in the openings and are substantially fixed in the openings. In one example, the diameters of the openings 176 in the base securement plate 168 are sized to allow a maximum of about 10 degrees of movement of the sliding plate 170, and more preferably a maximum of about 5 degrees and in the illustrated embodiment maximum of about 3 degrees. The diameters of the openings 178 are preferably somewhat larger than the diameters of the tension members 122, and in the illustrated embodiment are about 3 mm (⅛ inch) larger. Moreover, gaps 180, 182 between adjacent extensions 162 of the respective plates 168, 170 are generally aligned with the other longitudinal spaces 129 so as not to impede fluid flow through the respective spaces.

The sliding securement plate 170 has a concave bearing surface 188 (FIG. 18) that is coupled with a convex bearing surface 190 (FIG. 16) of the base securement plate 168. As shown best in FIG. 10, the bearing surfaces 188, 190 are held in contact with one another by the tension members 122, which extend through the respective openings 176, 178 in the plates 168, 170 and are secured thereto by swage terminals 142. The base and sliding securement plates 168, 170, respectively, are otherwise unattached to one another so that the sliding securement plate is free to rotate about its axis and slide on the convex bearing surface 190 of the base securement plate. The bearing surfaces 188, 190 may be coated with a high temperature grease (e.g., Seize Stop Omega 99 available from MMT Industries, Inc. of Randolph, Me.) or other lubricous material to facilitate sliding and rotating movement of the sliding securement plate 170. The larger diameter openings 176 in the base securement plate 168 allow the sliding securement plate 170 to slide in any radial direction on the base securement plate and to rotate about its axis. As a result, the tension assembly 120 allows the first and second pipe sections 114, 116 of the expansion joint 110 to rotate about their respective axes and/or bend or deflect in all directions relative to one another at the bellows 112 to absorb expansion or other movement of the pipes in a pipe system. At the same time, the tension assembly 120 provides tensile support so that the expansion joint 110 does not pull apart at the bellows 112 when it is subjected to an internal thrust load.

A maximum radial and angular displacement of the sliding securement plate 170 relative to its unloaded position on the fixed securement plate 168 (i.e., its position without any load applied to the expansion joint 110) is restricted or limited by the diameter of the openings 176 in the fixed securement plate and the diameter of the tension members 122, more specifically by the ratios of the diameter of the openings and the diameters of the tension members. In turn, the maximum radial and angular displacement of the first and second pipe sections 114, 116 relative to one another is also limited by the diameter of the openings 176 and the diameters of the tension members 122. In the illustrated embodiment, the sliding securement plate 170 and the base securement plate 168 are generally coaxial when the sliding securement plate is in its unloaded position. When the sliding securement plate 170 is in its maximum radially displaced position and/or its maximum angularly displaced position relative to its unloaded position, at least one of the tension members 122, and preferably all of the tension members, contact the edges of the respective openings 176 in the base securement plate 168 to prevent further sliding and/or rotation of the sliding securement plate on the base securement plate, which prevents further radial and/or angular displacement of the first and second pipe sections 114, 116 relative to one another.

Figure 19:
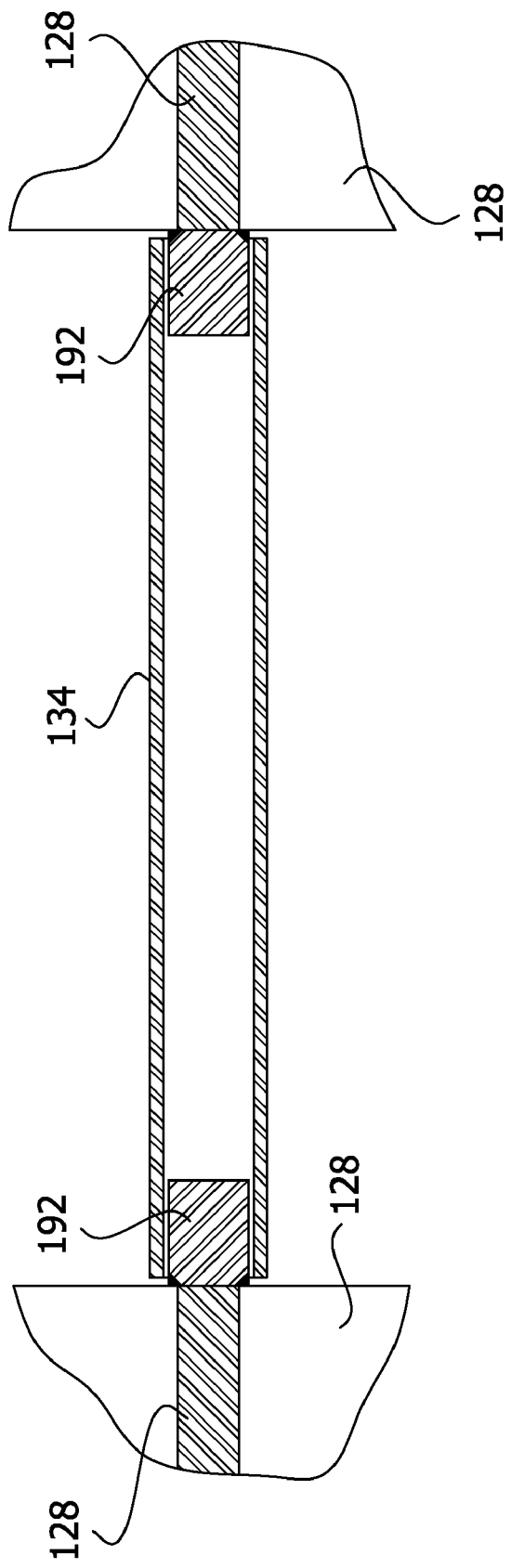
FIG. 19 is an enlarged fragmentary view of FIG. 10 illustrating the compression member.

Referring to FIGS. 9, 10 and 19, the expansion joint 110 also includes a compression member 134 in the form of a rigid tube secured to and extending between adjacent faces of the first and second mounts 124, 126. Cylindrical, mounting inserts 192 are attached to braces 128 of the respective first and second mounts 124, 126, such as by welding. The mounting inserts 192 are received in open ends of the compression member 134 to mount the compression member on the mounts 124, 126. The mounting inserts 192 are configured to allow the compression member 134 to slide axially along the inserts. Through this arrangement, the compression member 134 does not affect or prohibit the first and second pipe sections 114, 116 from moving away from one another. That is the compression member 134 does not impart any tensional forces on the expansion joint 110. The compression member 134 also does not prevent bending or flexing of the expansion joint 10. Instead, like the compression member 34 in the first embodiment, the compression member 134 in the second embodiment provides compressive support to the expansion joint 110 so that internal compressive forces do not completely collapse the bellows 112. Axial forces tending to collapse the bellows 112 cause the pipe sections 114, 116 and thus the first and second mounts 124, 126, to move toward each other. When the distance between the mounts 124, 126 equals the length of the compression member 134, the compression member engages the mounts 124, 126 and resists further convergence of the mounts and thereby further collapse of the bellows 112.

The illustrated embodiment includes a single compression member 134 that is coaxial with the first and second mounts 124, 126 and the first and second pipe sections 114, 116. It is understood that the expansion joint 110 may include more than one compression member and the one or more compression members may not be coaxial with the first and second mounts without departing from the scope of the present invention. It is also understood that the expansion joint may not include a compression member without departing from the scope of the present invention.

As mentioned above, the second embodiment of the expansion joint 110 may be employed in a piping system when the anticipated load exceeds the maximum load that the single tension member expansion joint can handle. In use the expansion joint 110 is secured to adjacent pipes (such as those shown in FIG. 4) in a pipe system to allow for relative movement between the adjacent pipes. In one example, the expansion joint 110 may be employed in a pipe system at a processing plant to transfer gaseous fluid, such as $SO_2$, within the plant. Arcuate splice plates 150, 152 may be used to secure the expansion joint 110 to adjacent pipes as described above with respect to the first embodiment. Preferably, the expansion joint 110 is mounted within the piping system so that the fixed securement plate 140 is upstream of the base securement plate 168 and the sliding securement plate 170.

The configuration of the tension members 122, the fixed securement plate 160 and the articulating securement plates (i.e., the base securement plate 168 and the sliding securement plate 170) allow for restricted bending or deflection in all directions at the bellows 112 to absorb expansion or other movement of the pipes in the pipe system while, at the same time, providing tensile support so that the expansion joint does not pull apart at the bellows when it is subjected to an internal thrust load. As explained above, the sliding securement plate 170 can slide radially in any direction and rotate on the base securement plate 168. This, in effect, allows for restricted bending or deflection in all directions at the bellows 112. In the illustrated embodiment, the tension assembly 120 does not provide any substantial biasing force to bias the joint 110 in a selected configuration (e.g., a linear configuration). Moreover, the compression member 134 provides compression support so that the expansion joint 110 does not completely collapse at the bellows 112.

Having described the invention in detail, it will be apparent that modifications and variations are possible without departing from the scope of the invention defined in the appended claims.

When introducing elements of the present invention or the illustrated embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods departing from the scope of the invention, it is intended that all matter contained in the above description and shown in the accompanying drawings shall be interpreted as illustrative and not in a limiting sense.

What is claimed is:

1. An expansion joint for a pipe system comprising:
   a first pipe section defining a first passageway having a longitudinal axis;

a second pipe section defining a second passageway having a longitudinal axis;

a deformable section interconnecting the first and second pipe sections so that the first and second passageways are fluidly connected, the deformable section being constructed to deform upon relative movement of the first and second pipe sections with respect to each other;

a first mount secured to the first pipe section in the first passageway, wherein the first mount includes a hub defining a passage, and a plurality of braces extending radially from the hub of the first mount and secured in the first passageway;

a second mount secured to the second pipe section in the second passageway, wherein the second mount includes a hub defining a passage, and a plurality of braces extending radially from the hub of the second mount and secured in the second passageway; and a flexible tension member tethering the first and second mounts to each other to limit a linear separation between the first and second pipe sections, the flexible tension member extending through the deformable section and within the respective passages defined by the hubs of the first and second mounts, wherein each of the first and second mounts includes a plurality of braces secured to the first and second pipe sections in the corresponding first and second passageways, and wherein the expansion joint further comprises stiffening members for each of the first and second mounts, the stiffening members extending between adjacent braces of each of the first and second mounts.

2. An expansion joint as set forth in claim 1 wherein the braces of the first mount are spaced equally around the longitudinal axis of the first passageway and the braces of the second mount are spaced equally around the longitudinal axis of the second passageway.

3. An expansion joint as set forth in claim 2 wherein the braces of the first mount have thicknesses extending generally transversely with respect to the longitudinal axis of the first passageway, and the braces of the second mount have thicknesses extending generally transversely with respect to longitudinal axis of the second passageway.

4. An expansion joint as set forth in claim 1 further comprising a generally rigid compression member operatively connected to the flexible tension member between the first and second mounts and disposed for engaging the mounts to restrain movement of the mounts toward each other.

5. An expansion joint as set forth in claim 4 wherein the compression member comprises a sleeve received over the flexible tension member.

6. An expansion joint as set forth in claim 5 wherein the tension member comprises a stainless steel wire rope.

7. An expansion joint as set forth in claim 1, wherein each of the first and second mounts has a percentage of effective open area that is within a range from about 95% to about 97%.

8. An expansion joint for a pipe system comprising:

a first pipe section defining a first passageway having a longitudinal axis;

a second pipe section defining a second passageway having a longitudinal axis;

a deformable section interconnecting the first and second pipe sections so that the first and second passageways are fluidly connected, the deformable section being constructed to deform upon relative movement of the first and second pipe sections with respect to each other;

a first mount secured to the first pipe section in the first passageway;

a second mount secured to the second pipe section in the second passageway;

a flexible tension member tethering the first and second mounts to each other, the flexible tension member extending through the deformable section;

another flexible tension member tethering the first and second mounts to each other, wherein the first mount includes: a plurality of first braces secured in the first passageway and extending generally transversely with respect to the first passageway; and a first securement plate operatively connected to the first braces, wherein the second mount includes: a plurality of second braces secured in the second passageway and extending generally transversely with respect to the second passageway; and a second securement plate operatively connected to the second braces, wherein each of said flexible tension members are attached to the first and second securement plates.

9. An expansion joint as set forth in claim 8 wherein the first securement plate comprises a fixed securement plate fixedly attached to the first braces, and wherein the second securement plate comprises a sliding securement plate configured for sliding, radial movement relative to the second braces.

10. An expansion joint as set forth in claim 9 wherein the second securement plate further includes a base securement plate that is fixedly attached to the second braces, wherein the sliding securement plate is coupled to the base securement plate and adapted to slide on the base securement plate.

11. An expansion joint as set forth in claim 10 wherein the base securement plate has a convex bearing surface and the sliding securement plate has a concave bearing surface that engages the convex bearing surface for relative sliding movement.

12. An expansion joint as set forth in claim 10 wherein each of the first and second securement plates define openings that receive the flexible tension members.

13. An expansion joint as set forth in claim 12 wherein the openings are spaced at equal intervals around centers of the respective first and second securement plates.

14. An expansion joint as set forth in claim 8 further including a compression member having open opposite ends operatively connected to an engageable with the first and second mounts for limiting convergence of the first and second mounts.

15. An expansion joint as set forth in claim 14 further comprising mounting inserts projecting outward from the first and second mounts and into the open opposite ends of the compression member so that the compression member is capable of sliding axially on the mounting inserts.

* * * * *